(12) United States Patent
Davenport et al.

(10) Patent No.: US 8,670,856 B2
(45) Date of Patent: Mar. 11, 2014

(54) ALGORITHMIC FRAMEWORK FOR THE INTEGRATED OPTIMIZATION OF HOT STRIP MILL AND UPSTREAM MOLTEN METAL OPERATIONS FOR A LARGE-SCALE STEEL MANUFACTURING PLANT

(75) Inventors: Andrew J. Davenport, Seattle, WA (US); Toshiyuki Hama, Tokyo (JP); Jayant R. Kalagnanam, Tarrytown, NY (US); Chandrasekhara K. Reddy, Kinnelon, NJ (US); Stuart A. Siegel, Millburn, NJ (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 13/164,339

(22) Filed: Jun. 20, 2011

(65) Prior Publication Data

US 2012/0323353 A1 Dec. 20, 2012

(51) Int. Cl.
*G05B 13/04* (2006.01)
(52) U.S. Cl.
USPC .......................................... 700/104; 700/100
(58) Field of Classification Search
USPC ....................................... 700/104, 100, 97, 99
See application file for complete search history.

(56) References Cited

U.S. PATENT DOCUMENTS

2003/0195648 A1* 10/2003 Bacin et al. ................... 700/100

OTHER PUBLICATIONS

Cowling, et al., "A multi-agent architecture for dynamic scheduling of steel hot rolling". Journal of Intelligent Manufacturing Oct. 2003, vol. 14, Issue 5, pp. 457-470.*
Ouelhadj et al., "Inter Agent Cooperation and Communication for Agent-based Robust Dynamic Scheduling in Steel Production." Advanced Engineering Informatics, vol. 18, Issue 3, Jul. 2004, pp. 161-172.*
Knoop et al., Scheduling Requirements for Hot Charge Optimization in an Integrated Steel Plant. Conference Record of the Industry Applications Conference, 2003. 38th IAS Annual Meeting. vol. 1 IEEE 2003 pp. 74-78.*
Chen et al., "Real-time Scheduling Method for Steelmaking-Continuous Casting" 2010 IEEE International Conference on Industrial Engineering and Engineering Management (IEEM), 2010. pp. 2366-2370.*
Cowling et al., "Integration of Continuous Caster and Hot Strip Mill Planning for Steel Production." Journal of Scheduling vol. 3, Issue 4, pp. 185-208, Jul./Aug. 2000.*
Atighehchian et al., "A novel hybrid algorithm for scheduling steelmaking continuous casting production."Computers & Operations Research 36 2009. pp. 2450-2461.*

(Continued)

*Primary Examiner* — Mohammad Ali
*Assistant Examiner* — Emilio J Saavedra
(74) *Attorney, Agent, or Firm* — Scully, Scott, Murphy & Presser, P.C.; Daniel P. Morris, Esq.

(57) ABSTRACT

A method and system for optimizing modules of a steel manufacturing process includes a plurality of manufacturing modules for a manufacturing process. Each of the modules have a plurality of steps. The plurality of modules include at least an upstream module, a casting module, and a downstream module. Each of the plurality of modules have parameters, and include at least one variable event. The variable event is adjustable for optimization of the manufacturing process while the parameters are being maintained for each of the plurality of modules. A communication system is used for exchanging information between the modules while the manufacturing process is occurring to adjust the at least one variable event for optimizing the manufacturing process.

15 Claims, 4 Drawing Sheets

(56) References Cited

OTHER PUBLICATIONS

Ouelhadj, Djamila. A Multi-Agent System for the Integrated Dynamic Scheduling of Steel Production . Thesis submitted to The University of Nottingham for the degree of Doctor of Philosophy . Aug. 2003.*

Tang et al., "A review of Planning and scheduling systems and methods for integrated steel production." European Journal of Operational Research. 133 2001. pp. 1-20.*

Sun et al., "The Scheduling of Steel-making and Continous Casting Process Using Branch and Cut Method via CPLEX Optimization." International Conference on Computer Sciences and Convergence Information Technology (ICCIT), 2010 5th. pp. 716-721.*

Ji et al., "A Multi-Agent and Extremal Optimization System for Steelmaking—Continuous Casting—Hot Strip Mill Integrated Scheduling" Conference on Industrial Engineering and Engineering Management, 2009. IEEM 2009. pp. 2365-2369.*

* cited by examiner

ALGORITHMIC FRAMEWORK FOR THE INTEGRATED OPTIMIZATION OF HOT STRIP MILL AND UPSTREAM MOLTEN METAL OPERATIONS FOR A LARGE-SCALE STEEL MANUFACTURING PLANT

FIELD OF THE INVENTION

The present invention relates to a method for improving efficiency of a manufacturing process, and more specifically, relates to a method of improving the integration between upstream molten metal and downstream hot strip mill operations in a large-scale steel manufacturing plant.

BACKGROUND OF THE INVENTION

The large-scale manufacture of steel coils is a multi-stage process. The term large-scale refers to steel mills that process raw iron ore to produce finished steel products. In contrast, mini-mills typically begin with comparatively smaller quantities of scrap steel that is re-melted to produce finished steel products. Generally, a steel mill processes molten iron to molten steel having a desired range of chemical and physical characteristics. The molten metal is then cast into discrete slabs in a continuous casting operation, and these slabs are eventually flattened and rolled into coils at a hot strip mill.

At each stage of the steel manufacturing process, numerous process constraints and business objectives guide the operation of the manufacturing resources involved. Optimization systems can handle individually, the highly detailed constraints and objectives of a particular part of the process. For example, optimization systems may be directed to upstream molten metal handling or downstream hot strip mill (HSM) operations. However, due to inherent difficulties, the prior art fails to link independent optimization systems (or modules) in an integrated optimization framework. The difficulties are derived from the detailed nature of the constraints and objectives that guide each optimization module. Therefore one problem with developing and building a tightly coupled optimization system that models all aspects of the manufacturing process is that it leads to computationally large and intractable models for the computing environments typically deployed at steel mills.

It would therefore be desirable to provide an optimization method that addresses all the subsystems of the manufacturing process. Further, there is a need for an optimization method to provide an efficient and effective mechanism to achieve integrated process optimization in a manufacturing process, such as a large scale steel manufacturing facility.

SUMMARY OF THE INVENTION

In an aspect of the invention, a method for optimizing modules of a manufacturing process comprises: defining a plurality of optimization modules for a manufacturing process each of the modules having a plurality of steps; defining parameters for each of the pluralities of modules; determining at least one variable event for each of the modules; exchanging information between the modules to adjust the at least one variable event for optimizing the manufacturing process; adjusting the at least one variable event in each of the modules to optimize the manufacturing process.

In anther aspect of the invention, a system for optimizing modules of a steel manufacturing process comprise a plurality of manufacturing modules for a manufacturing process. Each of the modules have a plurality of steps, the plurality of modules include at least: an upstream module, a casting module, and a downstream module. Each of the plurality of modules have parameters, and each of the plurality of modules include at least one variable event. The variable event is adjustable for optimization of the manufacturing process while the parameters are being maintained for each of the plurality of modules. A means for exchanging information between the modules while the manufacturing process is occurring, adjusts the variable event for optimizing the manufacturing process.

In another aspect of the invention, a computer program product comprises a non-transient computer readable medium having recorded thereon a computer program. A computer system includes a processor for executing the steps of the computer program for optimizing modules of a steel manufacturing process. The program steps comprise:
defining a plurality of optimization modules for a manufacturing process each of the;
determining at least one variable event for each of the modules;
exchanging information between the modules while the manufacturing process is occurring to adjust the at least one variable event for optimizing the manufacturing process; and
adjusting the at least one variable event in each of the modules to optimize the manufacturing process.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 1:
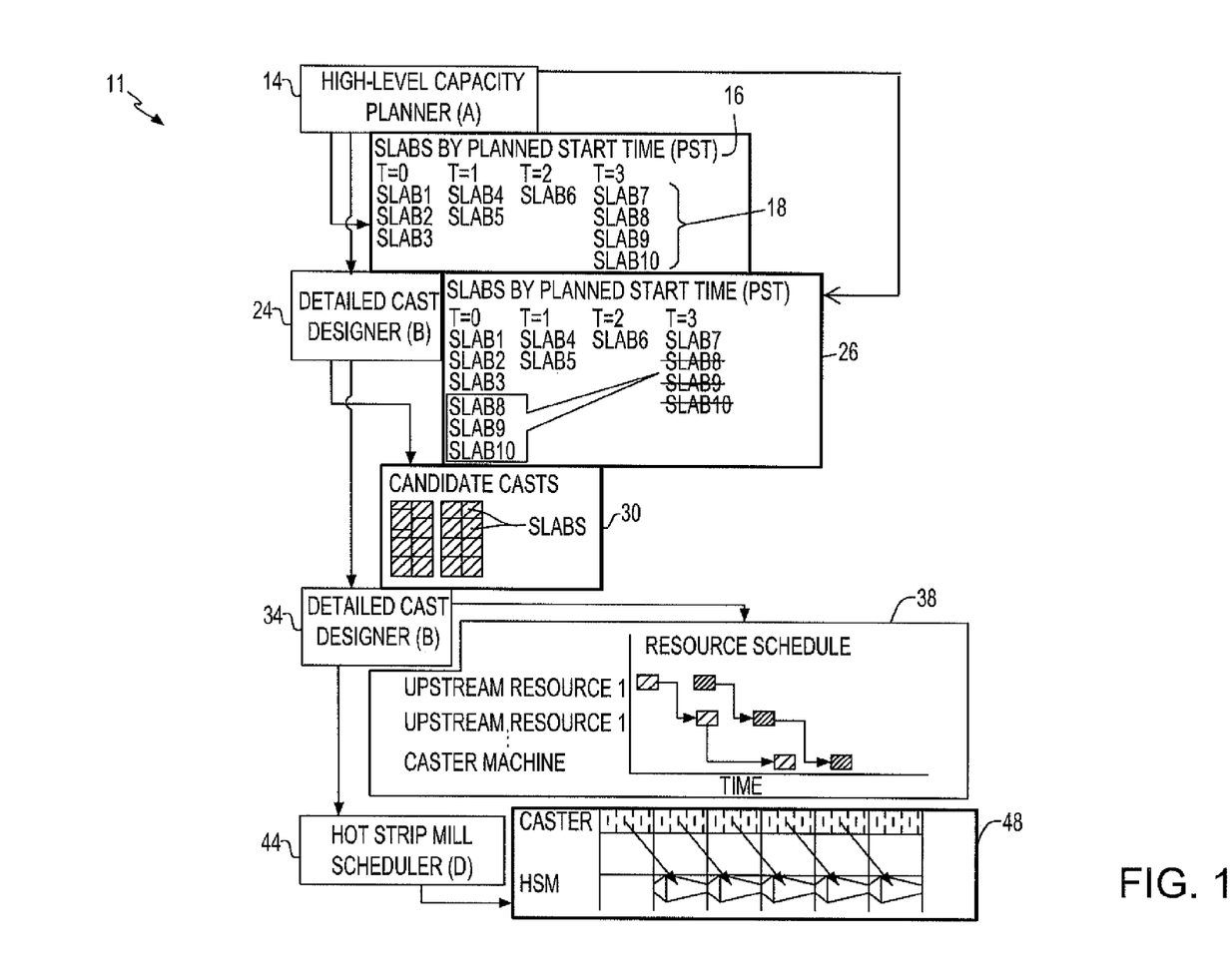
FIG. 1 is a schematic block diagram of a method according to an embodiment of the invention.

The present invention provides a method of integrating the process optimization of both upstream molten metal and hot strip mill operations at a large-scale steel manufacturing plant. The present invention further provides a method of integrating independent optimization modules. For example, steel processing modules may include upstream, casting, and downstream. Upstream includes molten metal, casting includes pouring into a cast, and downstream includes rolling and flattening the steel into a product. Referring to FIG. 1, a first module is a cast designer/scheduler optimization module that handles upstream (relative to the hot strip mill (HSM)) molten metal considerations, and the second module is a hot strip mill (HSM) optimizer. Generally, the integration is achieved via the operation of each module in an iterative fashion with information exchange between the modules occurring at each phase of the overall flow. The information exchanged includes the scheduled casting times and planned start time (PST) of individual slabs. This data is used to adjust the objective formulation within each module to produce a result that is preferable and feasible from an HSM perspective with only minimal impact on upstream process objectives. System and computer program products corresponding to the above-summarized methods may also be used for implementing the invention disclosed herein.

Referring to FIG. 1, a schematic 11 of the principle process optimization modules for a method and system according to an embodiment of the invention includes Module "A" 14 as a high-level capacity planner. Module A 14 takes long-term planning information (such as planned maintenance cycles, customer demand, and delivery preferences) and produces a partitioning of virtual slabs 18. The slabs are termed virtual in that they have not been cast by a caster yet. The partitioning of the virtual slabs is based on a planned start time (PST). Table 16 in FIG. 1 marked "Slabs by Planned Start Time (PST)", represents this output. Referring to the table 16 in FIG. 1, a slab in column T=N has higher production priority than a slab in a column T=M where N<M.

An optimization module B 24, also called a detailed cast designer module, assembles virtual slabs in to collections called "casts" using a detailed optimization model. The optimization occurs with respect to many detailed engineering-level process and business constraints such as:

Steel grade mixing and sequencing limits;
Slab geometry constraints on the difference between the width of successive slabs as well as the sum of total width differences in the entire cast. These limits reflect the limits on the rate at which a continuous caster can change the width of a strand and the amount of thermal stressing allowed for the semi-solid shell of a continuous casting strand;
Length balancing between strands of a cast;
Unplanned maintenance outages; and other.

The overall objective of the detailed cast designer module 24 is to produce casts such that width and grade transitions are minimized without producing excessive surplus slabs. Surplus slabs are bridge slabs that do not have an actual customer order assigned to them and thus impose inventory, production, and handling costs without a definite revenue potential to. They are sometimes necessary to help complete sequences (making it possible to cast high priority slabs) when there are not enough real customer slabs to satisfy geometrical, steel grade, or other casting process constraints.

As mentioned above, the PST partitioning table 16 generated by module A 14 serves as a template for assigning slabs to casts. In general, if detailed process constraints allow, early PST slabs will be given higher priority for inclusion in casts. Exceptions arise if early PST slabs are, for example, out of the ordinary with respect to grade or geometry, and thus cannot be easily grouped together in casts without incurring excessive surplus. The prior art in this situation was to introduce the aforementioned surplus slabs in order to maximize inclusion of early PST slabs.

Significantly, the treatment of slab PST information in module B 24 is discussed below. Instead of honoring module A's 14 prescribed slab PST table 16 in all situations, module B 24 will search through later PST slabs in an effort to find those that can be used in earlier casts where the only alternative would be to include surplus. The above is shown in FIG. 1, in the PST partition table 26 next to module B 24. For example, slabs numbered 8, 9, and 10 are reassigned from PST column T=3 to column T=0 because they are grade and/or geometrically compatible with earlier PST slabs thereby making it possible to the delivery requirements of the latter, without introducing the costs associated with surplus slabs. The above is an example of timing preferences.

Module B 24 generates casts for all slabs within some time period (in common practice, 10-days). However, upstream molten scheduling is typically done for a period of two-days in the industry so only a subset of designed casts are passed to module C 34 for scheduling. The subset is based on available upstream processing capacity for a two-day horizon giving preference to casts that contain comparatively more early PST slabs.

Module C 34 is a detailed slab scheduler, and takes (2-day subset) candidate casts 30 generated by module B 24 and selects a subset such that early PST inclusion is maximized subject to upstream capacity limits. Upstream molten-metal processing resources are then scheduled such that capacity is maximally utilized. This is schematically showed in the FIG. 1 as the "Resource Schedule" 38. The resources listed as "Upstream resource 1, 2, ..." represent batch processes that transform the molten iron into molten-steel of a desired chemical composition. As with module B 24, module C 34 accounts for a large number of detailed process constraints. For example:

Minimum and maximum transfer times between resources;
Minimum and maximum tonnage of molten metal of a specific grade processed within a given time period;
Grade dependent setup times between processes;
Preferred and alternate process route considerations;
Overall plant hot-metal production and balancing constraints The result of module C, the detailed scheduled, is then passed to module D, the hot strip mill (HSM) optimizer. The module selects a sequence of slabs from the caster for rolling in the HSM. The objective module C 34 selects slabs from the caster such that the number of slabs that can be directly hot charged (DHC) in the HSM is maximized subject to a large number of constraints on the physical (e.g., hardness, tensile strength, etc.) and geometric (e.g., thickness) properties of successive slabs in a sequence. DHC refers to the practice of processing slabs at the HSM before they have become too cool to be rolled. Once a slab has cooled below a threshold temperature, it needs to be reheated in a furnace to make it malleable enough for rolling. This incurs a very large energy cost so the objective of maximizing the number of slabs that are direct hot charged is quite important. If slabs are not arranged in casts such that their proximity (in both time and space) is appropriate, they must be rearranged (while they continuously cool down) compromising the opportunities for DHC.

The task of integrating the above modules to produce an optimization solution can be challenging. For example, each module handles a large number of detailed process constraints. From a modeling perspective, this complicates the task because problem intractability can occur. Additionally, from a software engineering perspective, having each model developed as independently as possible and then loosely coupling them is desirable for it allows for future maintenance and upgrades using a component model. Not only is it desirable, it often is the only option when forced to integrate systems developed at different times or by different solution vendors.

The present invention provides a method of loosely coupling the detailed upstream molten-metal optimization modules B 24, and C 34, with a detailed HSM optimization module D 44. After the first invocation of modules B 24 and C 34, the detailed HSM optimization module D 44 receives the resulting list of scheduled slabs (contained within the scheduled casts). Module D 44 also receives the list of unscheduled slabs. The unscheduled slabs are important because there may be unscheduled slabs within the list that suit particular HSM objectives, but did not contribute favorably to the objectives in modules B 24 and C 34.

Module D 44 solves an independent optimization problem, and then returns a table 48 of preferred slab hot strip mill processing time windows. This is similar to the PST table 26 discussed above, except slabs are partitioned by time ranges that best fit HSM objectives instead of by pure casting-level objectives. For example, referring to FIG. 2, table 140 groups slabs 1, 2, 3, 7, and 9 in the time window 142 of T=0, T=30 minutes. Via this table, module D 44 informs modules B 24 and C 34 about the desired casting time window for these slabs.

The process flow can be implemented in either of two modes. A first mode, termed "full integration", passes the results of module D 44 back to module B 24, the detailed cast designer. Module B 24 will completely redesign candidate casts in an attempt to accommodate the slab timing preferences expressed in module D's 44 result. The slabs in question are artificially marked as early PST slabs, thereby increasing their priority and likelihood of appearing in the pool of candidate casts ultimately passed to module C 34.

A second mode, "partial integration", bypasses module B 24 and attempts to adjust the pool of casts selected from the original collection of candidate casts by giving higher preference to those casts that contain slabs in the partition table. In addition to altering the set of casts it selects, the scheduling priority of these casts will be adjusted (to the extent possible) such that slabs complete the casting operation within the desired time window prescribed by module D 44.

The choice between full or partial integration modes depends on the time budget allotted for a solution. Full integration is able to increase the number of slabs casts that are in the hot charge window because the candidate cast pool passed to module C has been redesigned such that module D's desired slabs are much more likely to be cast. This, in turn, makes it more likely that module C will be able to schedule these slabs within the desired time windows (allowing them to remain hot enough for direct hot charging). Full integration yields a higher percentage of slabs that can be directly hot charged which results in a significant savings in energy (reheat) costs for the manufacturer. System performance of the loosely coupled integration strategy described above is within an acceptable range (for example, less than 2 hours) to allow for daily planning and modification of shop floor activities in response to model results.

Figure 2:
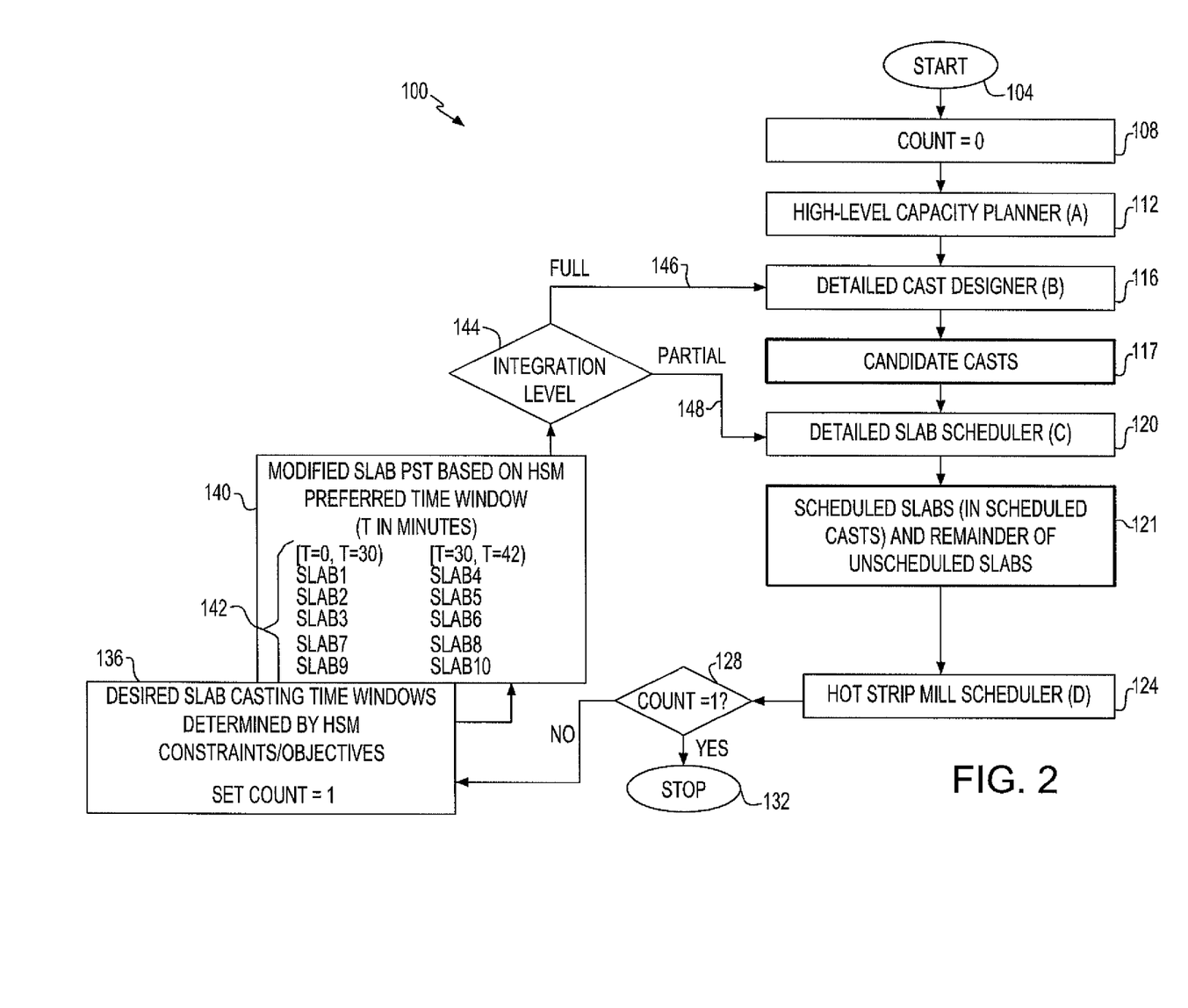
FIG. 2 is a flow diagram depicting the method of the invention shown n FIG. 1.

Referring to FIG. 2 (with cross reference to FIG. 1), a method 100 incorporates an iterative algorithm for performing the invention discussed above. The method 100 starts at step 104 and moves to initiate a loop count variable at step 108. Step 112 includes initiating the high level capacity planner A 14 shown in FIG. 1. Step 116 includes the detailed cast designer B 24 communicating with the planner A 14 and communicating candidate casts 117 to the detailed slab scheduler C 34. In step 120, the detailed slab scheduler C 34 receives candidate casts 117 from the detailed cast designer B 24 of step 116. The detailed slab scheduler C 34 of step 120 forwards scheduled slabs and remaining unscheduled slabs 121 to the hot strip mill scheduler D 44 which is received in step 124. Step 128 includes a decision regarding the counter, if the counter equals 1 the method 100 stops in step 132, if the counter does not equal 1, the method 100 (e.g., using a numeric tag) first sets the counter to 1 (so that the flow terminates the next time through), and then the method 100 proceeds to modify planned start times (PSTs) as shown in table 140, step 136 which includes determining slab casting time windows. Step 144 includes integrating the PSTs either by a full integration 146 and forwarding the information to the detailed cast designer B 24 in step 116, or a partial integration 148 and forwarding to the detailed slab scheduler C 34 in step 120.

Figure 3:
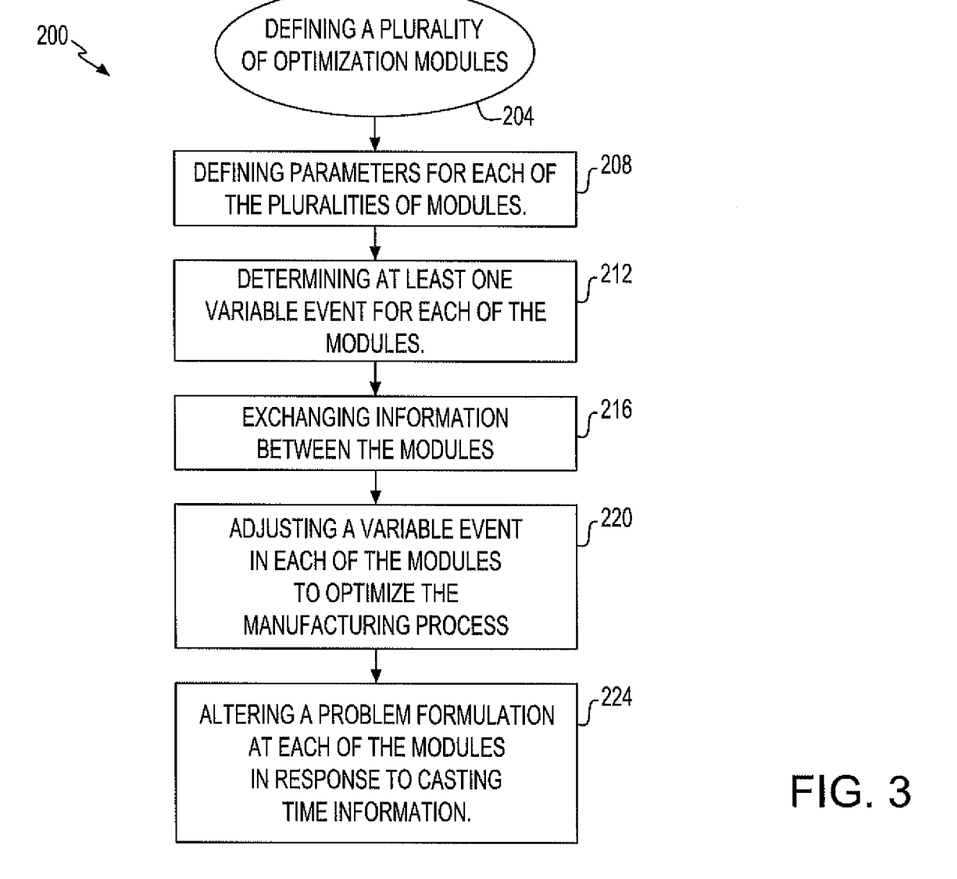
FIG. 3 is a flow diagram of an embodiment of a method according to the invention.

Referring to FIG. 3, a method 200 according to an embodiment of the invention for optimizing modules of a manufacturing process includes defining a plurality of optimization modules for a manufacturing process in step 204. In step 204, each of the modules have a plurality of steps. Step 208 includes defining parameters for each of the pluralities of modules. Step 212 includes determining at least one variable event for each of the modules. Step 216 includes exchanging information between the modules while the manufacturing process is occurring to adjust a variable event for optimizing the manufacturing process. Step 220 includes adjusting a variable event in each of the modules to optimize the manufacturing process. The method 200 may further include step 224 which includes altering a problem formulation at each of the modules in response to casting time information such that casts selected for casting are optimized in relation to one of the modules as a downstream hot strip mill (HMS) optimization module.

Advantages of the method of the present invention are provided through the provision of a method of integrating two independent optimization modules. A cast designer/scheduler optimization module handles upstream (relative to the HSM) molten metal considerations and a second module is a hot strip mill (HSM) optimizer. The integration is achieved via the operation of each module in an iterative fashion with information exchange between the modules occurring at each phase of the overall flow. The information exchanged includes the scheduled casting times and planned start time (PST) of individual slabs. Other engineering and production parameters may be exchanged and planned for, such parameters may include batch sizes, quantity of products, specifications of products, priorities, and time delivery times. The data is used to adjust the objective formulation within each module to produce a result that is preferable from an HSM perspective with only minimal impact on upstream process objectives. As a result of the present invention, a method is provided for integrating the process optimization of both upstream molten metal and hot strip mill operations at a large-scale steel manufacturing plant. Thereby, as described above in the embodiments of the invention, the present invention improves the integration between software-based optimization modules that guide the operations of upstream molten metal and downstream hot strip mill operations in a large-scale steel manufacturing plant.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams/schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 4:
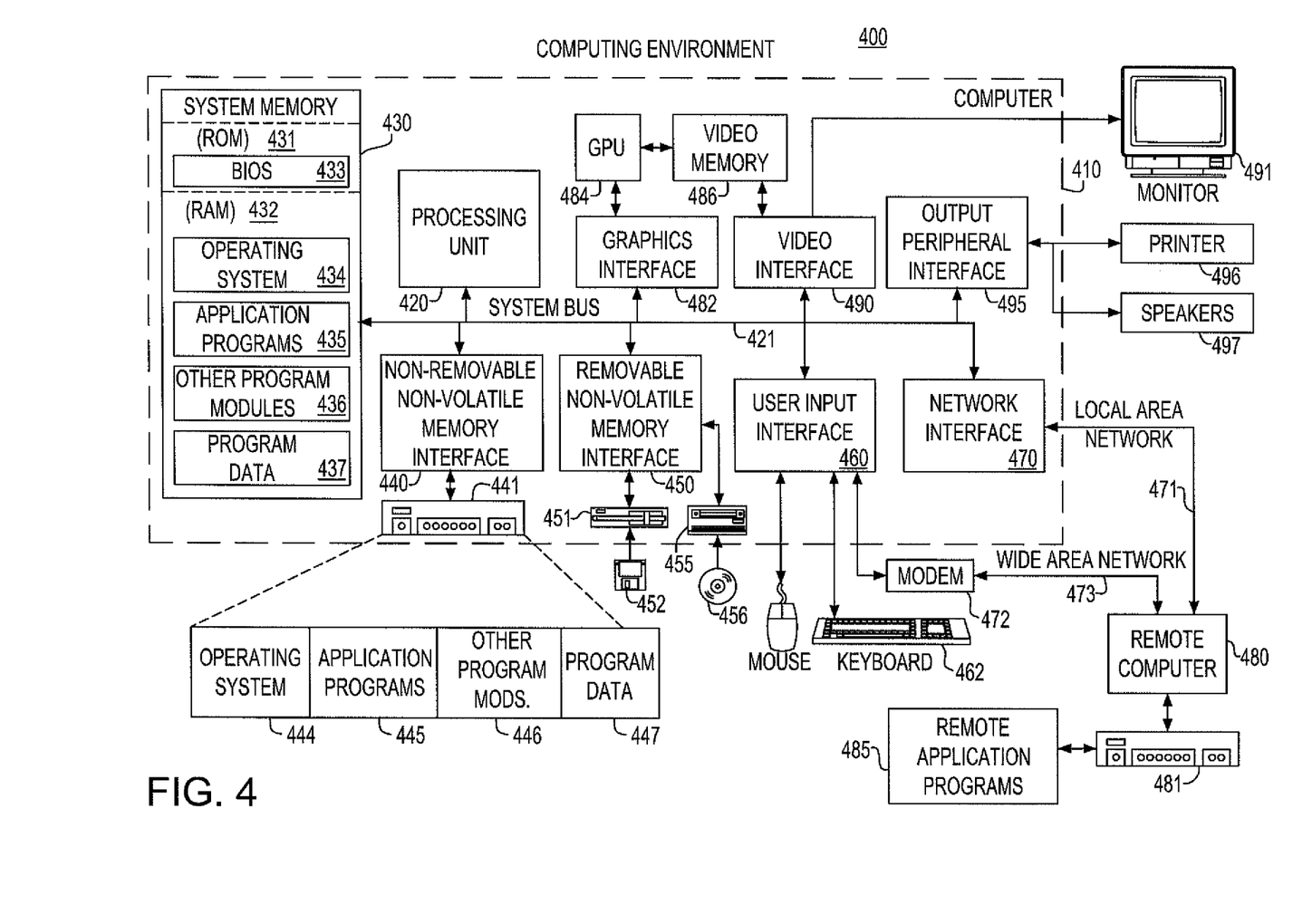
FIG. 4 is a schematic block diagraph of an embodiment of a computer environment for use by a computer program incorporating a method according to an embodiment of the present invention.

For example, FIG. 4 and the following discussion provide a general description of a suitable computing environment in which the invention may be implemented. It should be understood, however, that handheld, portable, and other computing devices of all kinds are contemplated for use in connection with the present invention. While a general-purpose computer is described below, this is but one example, the present invention may be implemented in an environment of networked hosted services in which very little or minimal client resources are implicated, e.g., a networked environment in which the client device serves merely as a browser or interface to the World Wide Web.

Although not required, the invention can be implemented via an application-programming interface (API), for use by a developer, and/or included within the network browsing software, which will be described in the general context of computer-executable instructions, such as program modules, being run or executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations.

Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 4, thus, illustrates an example of a suitable computing system environment 400 in which the invention may be implemented, although as made clear above, the computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

With reference to FIG. 4, an exemplary system for implementing the invention includes a general purpose-computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during startup, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating System 444, application programs 445, other program modules 446, and program data 447 are given different numbers here to illustrate that, at a minimum, they are different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

A monitor 491 or other type of display device is also connected to the system bus 421 via an interface, such as a video interface 490. A graphics interface 482, such as Northbridge, may also be connected to the system bus 421. Northbridge is a chipset that communicates with the CPU, or host-processing unit 420, and assumes responsibility for accelerated graphics port (AGP) communications. One or more graphics processing units (GPUs) 484 may communicate with graphics interface 482. In this regard, GPUs 484 generally include on-chip memory storage, such as register storage and GPUs 484 communicate with a video memory 486. GPUs 484, however, are but one example of a coprocessor and thus a variety of co-processing devices may be included in computer 410. The monitor 491 or other type of display device is also connected to the system bus 421 via an interface, such as a video interface 490, which may in turn communicate with video memory 486. In addition to monitor 491, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

One of ordinary skill in the art can appreciate that a computer 410 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and implementation capabilities.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for optimizing modules of a manufacturing process, comprising:
configuring a plurality of optimization modules for a manufacturing process each of the modules performing a plurality of steps;
defining parameters for each of the pluralities of modules;
determining at least one variable event for each of the modules;
operating each optimization module in an iterative fashion, and
exchanging information between the modules while the manufacturing process is occurring to adjust the at least one variable event for optimizing the manufacturing process, wherein in a first iteration, a first optimization module designs and communicates candidate casts for downstream processing to a second optimization module, the second optimization module responsively generating scheduled slabs and forwarding said scheduled slabs and any remaining unscheduled slabs to a third module according to a casting-level objective, said third module determining slab hot strip mill (HSM) processing time windows as partitioned time ranges for said slabs according to a HSM processing objective in which an independent optimization problem is solved in said third optimization module; and
in a second iteration, one of:
exchanging information of said determined slab hot strip mill (HSM) processing time windows from said third module to said first module and adjusting the at least one variable event in each of the modules to optimize the manufacturing process, wherein said first module redesigns candidate casts according to partitioned time ranges; or
exchanging information of said determined slab hot strip mill (HSM) processing time windows from said third module to said second module and
adjusting the at least one variable event in each of the modules to optimize the manufacturing process, wherein said second module adjusts a scheduling priority of these scheduled slabs according to said partitioned time ranges.

2. The method of claim 1, wherein the step of adjusting the at least one variable event includes altering a problem formulation at each of the modules in response to casting time information such that casts selected for casting are optimized in relation to one of the modules as a downstream hot strip mill (HMS) optimization module.

3. The method of claim 1, further comprising:
repeating the steps of claim 1 and selecting a preferred optimized manufacturing process.

4. The method of claim 3, wherein the preferred optimized manufacturing process includes a preferred first module optimization having minimal impact on a second module optimization.

5. The method of claim 1, wherein the step of exchanging information includes information about the preferred casting time of slabs between the modules.

6. The method of claim 1, further comprising:
including a plurality of variable events, including: casting times, and planned start times of individual workpieces.

7. The method of claim 1, further comprising:
optimizing the steps of each of the modules for at least partially simultaneously running each of the plurality of modules.

8. The method of claim 1, wherein the manufacturing process is a steel manufacturing process, and the plurality of modules including at least: an upstream module, a casting module, and a downstream module.

9. The method of claim 1, further comprising:
optimizing the manufacturing process by adjusting one or more of the at least one variable events in each of the modules in addition to maintaining the parameters for each of the plurality of modules.

10. A system for optimizing modules of a steel manufacturing process, comprising:
a plurality of manufacturing modules for a manufacturing process, each of the modules configured to perform a plurality of steps, the plurality of modules including at least: an upstream module, a casting module, and a downstream module; each of the plurality of modules having parameters, and each of the plurality of modules including at least one variable event, the at least one variable event being adjustable for optimization of the manufacturing process while the parameters are being maintained for each of the plurality of modules; and
a memory storage device;
a processor device in communication with said memory storage device configured to perform a method to operate each of the modules in an iterative fashion, wherein in a first iteration, said upstream module designs and communicates candidate casts for downstream processing to said slab scheduler module, the slab scheduler module responsively scheduling slabs and forwarding said scheduled slabs and any remaining unscheduled slabs to said downstream module according to a casting-level objective, said downstream module determining slab hot strip mill (HSM) processing time windows as partitioned time ranges for said slabs according to a HSM processing objective in which an independent optimization problem is solved in said downstream module; and
in a second iteration, said processor device configured to either:
exchange information of said determined slab hot strip mill (HSM) processing time windows from said downstream module to said upstream module and adjusting the at least one variable event in each of the modules to optimize the manufacturing process, wherein said downstream module redesigns candidate casts according to partitioned time ranges; or
exchange information of said determined slab hot strip mill (HSM) processing time windows from said downstream module to said slab scheduler module and
adjusting the at least one variable event in each of the modules to optimize the manufacturing process, wherein said slab scheduler module adjusts a scheduling priority of these scheduled slabs according to said partitioned time ranges.

11. The system of claim 10, wherein the plurality of manufacturing modules further comprises:
a high level planner module, wherein said upstream module is a detailed cast designer module;
and said downstream module is
a hot strip mill scheduler module.

12. The system of claim 10, further including a plurality of variable events, including: casting times, and planned start times of individual slabs.

13. The system of claim 10, wherein the exchanging of information between the modules includes information about the preferred casting time of slabs between the modules.

14. A computer program product comprising a non-transitory computer readable medium having recorded thereon a computer program, the computer program having instructions which, when run a computer system including a processor for executing the steps of the computer program, will cause the computer system to optimize modules of a steel manufacturing process, the program steps comprising:
- configuring a plurality of optimization modules for a manufacturing process, each of the modules performing a plurality of steps;
- determining at least one variable event for each of the modules;
- operating each optimization module in an iterative fashion, and
- exchanging information between the modules while the manufacturing process is occurring to adjust the at least one variable event for optimizing the manufacturing process, wherein in a first iteration, a first optimization module designs and communicates candidate casts for downstream processing to a second optimization module, the second optimization module responsively generating scheduled slabs and forwarding said scheduled slabs and any remaining unscheduled slabs to a third module according to a casting-level objective, said third module determining slab hot strip mill (HSM) processing time windows as partitioned time ranges for said slabs according to a HSM processing objective in which an independent optimization problem is solved in said third optimization module; and
- in a second iteration, one of:
    - exchanging information of said determined slab hot strip mill (HSM) processing time windows from said third module to said first module and adjusting the at least one variable event in each of the modules to optimize the manufacturing process, wherein said first module redesigns candidate casts according to partitioned time ranges; or
    - exchanging information of said determined slab hot strip mill (HSM) processing time windows from said third module to said second module and
- adjusting the at least one variable event in each of the modules to optimize the manufacturing process, wherein said second module adjusts a scheduling priority of these scheduled slabs according to said partitioned time ranges.

15. The product of claim 14, further comprising:
- altering a problem formulation at each of the modules in response to casting time information such that casts selected for casting are optimized in relation to one of the modules as a downstream hot strip mill (HMS) optimization module.

* * * * *